US006478952B1

(12) United States Patent
Lin

(10) Patent No.: US 6,478,952 B1
(45) Date of Patent: Nov. 12, 2002

(54) CATALYTIC REFORMING PROCESS INCLUDING THE ADDITION OF ORGANIC ALUMINUM HALIDE

(75) Inventor: Fan-Nan Lin, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/619,590

(22) Filed: Jul. 19, 2000

(51) Int. Cl.$^7$ .................. C10G 35/085; C10G 35/09; B01J 38/54

(52) U.S. Cl. .................. 208/139; 208/137; 208/134; 208/135; 208/140; 502/20; 502/22; 502/32

(58) Field of Search ................ 208/134, 135, 208/137, 139, 140; 502/20, 22, 32

(56) References Cited

U.S. PATENT DOCUMENTS

| | | | |
|---|---|---|---|
| 2,899,378 A | 8/1959 | Herder | 208/65 |
| 3,158,662 A | 11/1964 | Reichie et al. | 260/683.75 |
| 3,287,253 A | 11/1966 | McHenry, Jr. et al. | 208/65 |
| 3,907,705 A | 9/1975 | Mertzweiller et al. | 252/430 |
| 4,059,645 A * | 11/1977 | Jacobson | 260/668 A |
| 4,066,740 A * | 1/1978 | Erickson et al. | 423/628 |
| 4,220,521 A | 9/1980 | Antos | 208/139 |
| 4,259,175 A | 3/1981 | McArthur | 208/113 |
| 4,337,144 A * | 6/1982 | Yoo | 208/120 |
| 4,832,821 A | 5/1989 | Swan, III | 208/65 |
| 5,318,689 A * | 6/1994 | Hsing et al. | 208/70 |
| 5,360,534 A * | 11/1994 | Rice et al. | 208/139 |
| 5,414,184 A | 5/1995 | Wu et al. | 585/708 |
| 6,013,847 A * | 1/2000 | Lin | 585/269 |
| 6,140,546 A * | 10/2000 | Lin et al. | 585/419 |
| 6,140,547 A * | 10/2000 | Lin et al. | 585/743 |
| 6,291,381 B1 * | 9/2001 | Lin et al. | 502/35 |
| 6,294,492 B1 * | 9/2001 | Lin | 502/35 |

* cited by examiner

*Primary Examiner*—Nadine Norton
(74) *Attorney, Agent, or Firm*—Jeffrey R. Anderson

(57) ABSTRACT

Deactivation of a reformer catalyst is inhibited by charging a hydrocarbon feed having a concentration of an organic aluminum halide compound to a reformer reactor operating under reforming conditions and containing a reformer catalyst.

44 Claims, 1 Drawing Sheet

CATALYTIC REFORMING PROCESS INCLUDING THE ADDITION OF ORGANIC ALUMINUM HALIDE

This invention relates to an improved catalytic reforming process. In another aspect, this invention relates to a method for inhibiting the deactivation of a reformer catalyst.

BACKGROUND OF THE INVENTION

Catalytic reforming is a well established refining process employed by the petroleum industry for upgrading low-octane hydrocarbons to higher-octane hydrocarbons. Typically, catalytic reforming involves the contacting of a naphtha hydrocarbon feed with a reformer catalyst under elevated temperatures and pressures.

Reformer catalysts typically comprise a metal hydrogen transfer component or components, a halogen component, and a porous inorganic oxide support. A reformer catalyst which has been employed widely throughout the petroleum industry comprises platinum as the metal hydrogen transfer component, chlorine as the halogen component, and alumina as the support.

Also, additional metallic promoter components, such as rhenium, iridium, ruthenium, tin, palladium, germanium and the like, have been added to the basic platinum-chlorine-alumina catalyst to create a bimetallic catalyst with improved activity, selectivity, or both.

In a conventional reforming process, a series of two to five reformer reactors constitute the heart of the reforming unit. Each reformer reactor is generally provided with a fixed bed or beds of catalyst which receive upflow or downflow feed. Each reactor is provided with a heater because the reactions which take place therein are predominantly endothermic. In a typical commercial reformer, a naphtha feed with a diluent of hydrogen or hydrogen recycled gas is passed through a preheat furnace, then downward through a reformer reactor, and then in sequence through subsequent interstage heaters and reactors connected in series. The product of the last reactor is separated into a liquid fraction and vaporous effluent. The vaporous effluent, a gas rich in hydrogen, may then be used as hydrogen recycled gas in the reforming process.

During operation of a conventional catalytic reforming unit, the activity of the reformer catalyst gradually declines over time. There are believed to be several causes of reformer catalyst deactivation, including, (1) formation of coke within the pores, as well as on the surface, of the catalyst, (2) agglomeration of the catalyst metal component or components, and (3) loss of the halogen component. Deactivation of a reformer catalyst can have the following negative impacts on the reforming process: (1) lower product octane 5 number; (2) higher required reaction temperature; (3) higher required reaction pressure; (4) decreased time between required catalyst regeneration (cycle time); (5) increased requirement for hydrogen; and (6) decreased selectivity.

It is known that processing a reformer feed which contains high concentrations of water can accelerate deactivation of a reformer catalyst by, for example, stripping the halogen component and increasing the rate of coke formation on the catalyst. To counteract the negative effects of processing a "wet" reformer feed, the reformer feed can be pre-dried; however, drying a wet reformer feed is an expensive process.

It has recently been discovered that adding small quantities of an inorganic aluminum chloride compound to a reformer feed during reforming can inhibit deactivation of the reformer catalyst. However, due to their solubility properties, inorganic aluminum chloride compounds are difficult to inject into the reformer feed in uniform quantities.

SUMMARY OF THE INVENTION

It is an object of the present invention to provide an improved reforming process employing a novel method which inhibits deactivation of a reformer catalyst.

It is a further object of the present invention to provide a method for inhibiting the deactivation of a reformer catalyst while reforming a wet hydrocarbon feed.

A still further object of the present invention is to provide a method for causing the presence of an inorganic aluminum chloride compound in a reformer reaction zone that overcomes the problems associated with injecting inorganic aluminum chloride compounds into a reformer feed.

Further objects and advantages of the present invention will become apparent from consideration of the specification and appended claims.

Accordingly, one embodiment of the invention is a process comprising charging a reformer feed having a concentration of an organic aluminum halide compound in the range of from about 0.001 to about 500 parts per billion by weight (ppbw) to a reformer reactor operating under reforming conditions and containing a reformer catalyst.

Another embodiment of the invention is a reforming process that comprises charging a hydrocarbon feed to a reformer reactor operated under reforming conditions and introducing in combination an organic aluminum halide compound into the hydrocarbon feed both in an amount that is effective to inhibit deactivation of the reformer catalyst.

Another embodiment of the invention is a reforming process that comprises charging a hydrocarbon feed to a reformer reactor operated under reforming conditions and introducing an organic aluminum halide compound and a nonmetallic chloride compound into the hydrocarbon feed both in amounts that are effective to inhibit deactivation of the reformer catalyst.

DETAILED DESCRIPTION OF THE INVENTION

Figure 1:
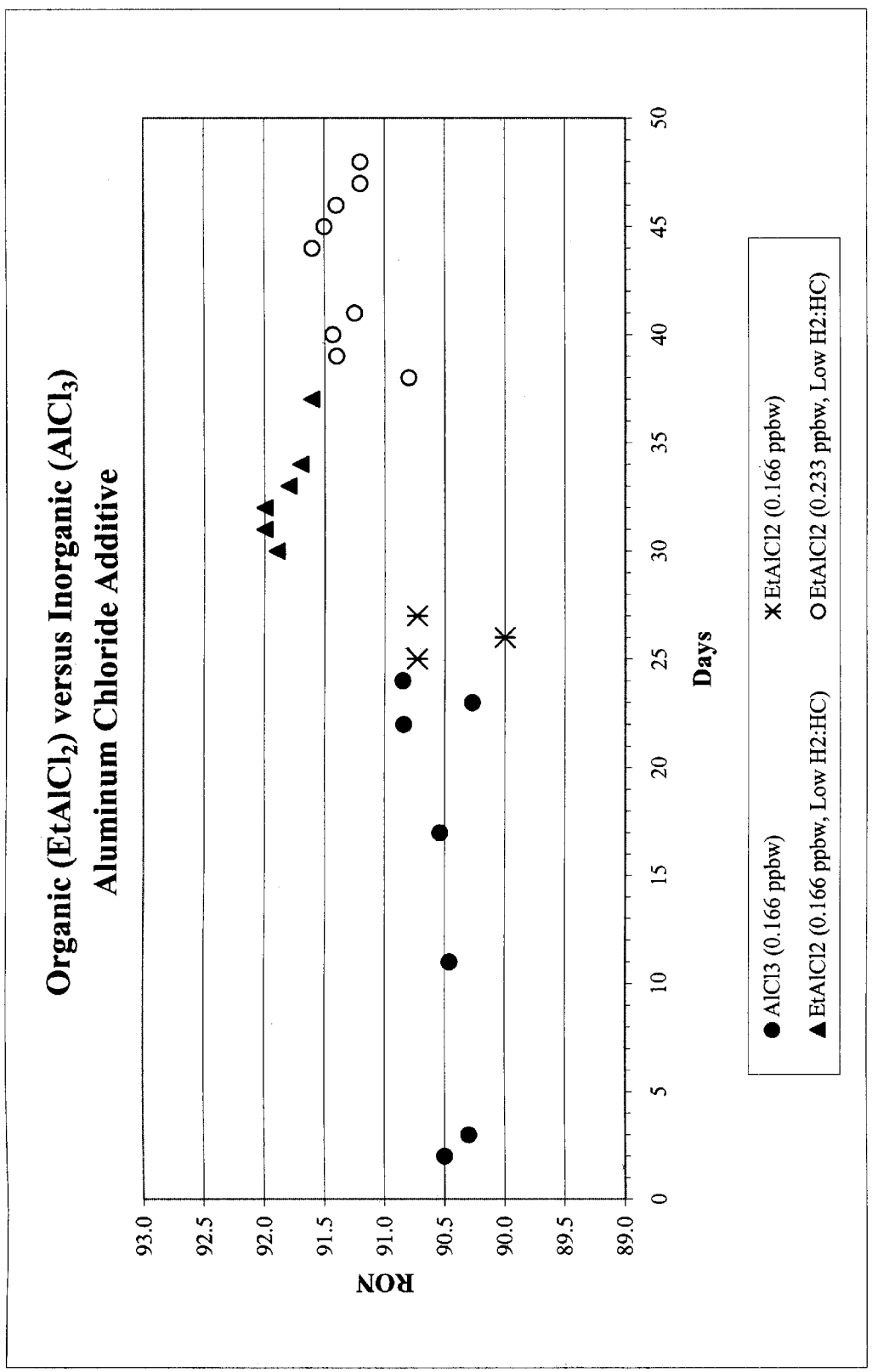
FIG. 1 is a chart plotting product octane number (RON) versus time for a reforming process employing an inorganic aluminum chloride feedstream additive and an organic aluminum chloride feedstream additive.

The present invention is based upon the discovery that, in a catalytic reforming process wherein a hydrocarbon feed is charged to a reformer reactor operated under reforming conditions, the presence of an organic aluminum halide in the hydrocarbon feed can be effective to inhibit deactivation of the reformer catalyst.

The reformer reactor employed in practicing the present invention may be any conventional reformer reactor known in the art. The reformer reactor may be a stand-alone reactor or may be part of a multiple-reactor reforming system. The reformer reactor defines a reaction zone which contains a reformer catalyst, usually provided in the form of a bed of such reformer catalyst. The catalyst bed may be fixed or moving, with fixed being the presently preferred configuration.

The reformer catalyst may be any catalyst capable of reforming a reformable hydrocarbon. Preferably, the reformer catalyst comprises at least one Group VIII metal component and a porous support material. More preferably, the reformer catalyst comprises at least one Group VIII metal component, a halogen component, and a porous support material. Even more preferably, the reformer catalyst is a bimetallic catalyst on a support and further including a halogen component, such as, a reformer catalyst comprising platinum, a metal selected from the group consisting of rhenium, iridium, tin, and germanium, a halogen component, and a refractory inorganic oxide support material. Most preferably, the reformer catalyst comprises, consists of, or consists essentially of platinum, rhenium, chlorine, and an alumina support.

The hydrocarbon feed charged to the reformer reactor comprises reformable hydrocarbons. The reformable hydrocarbons include hydrocarbons comprising naphthenes and paraffins that boil within the gasoline boiling range including, for example, straight-run naphthas, natural gasoline, synthetic naphthas, thermal gasoline, catalytically cracked gasoline, partially reformed naphthas, and raffinates from the extraction of aromatics. Preferably, the reformable hydrocarbons is naphtha comprising paraffins, naphthenes, and aromatics that boil within the gasoline boiling range, for example, within the range of from about 80° F. to about 450° F. It is preferred for the naphtha to comprise about 20 volume percent to about 80 volume percent paraffins, about 10 volume percent to about 70 volume percent naphthenes, and about 2 volume percent to about 30 volume percent aromatics.

An important advantage of the present invention is that it inhibits deactivation of a reformer catalyst even when the reformer feed has not been dried to a water level of less than 1 ppmw (parts per million by weight of the hydrocarbon feed). Thus, the present invention is particularly advantageous when the reformer feed is a wet hydrocarbon feed with a concentration of water exceeding about 1 ppmw. Specifically, the concentration of water in the hydrocarbon feed is from about 1 ppmw to about 500 ppmw, more particularly from about 5 ppmw to about 75 ppmw, and most particularly from 10 ppmw to 50 ppmw. Although the process of the present invention is particularly advantageous when employing a wet hydrocarbon feed, it is also effective for inhibiting catalyst deactivation when employing a dry hydrocarbon feed.

A diluent may be added to the hydrocarbon feed prior to introducing the hydrocarbon feed into the reformer reactor. Any diluent recognized in the art may be utilized either individually or in admixture with hydrogen. Hydrogen is the presently preferred diluent because it serves the dual function of lowering the partial pressure of the hydrocarbon feed and suppressing the formation of coke on the reformer catalyst. The weight ratio of diluent-to-hydrocarbon feed is preferably maintained at from about 1:2 to about 20:1, more preferably from about 1:1 to about 10:1, and most preferably from 3:1 to 6:1. It is preferred that the diluent be substantially water-free, with a water concentration of less than about 50 ppmw, more preferably less than about 5 ppmw, and most preferably less than 1 ppmw.

It is preferred for the hydrocarbon feed to be hydrotreated before reforming in order to remove impurities such as nitrogen and sulfur. The presence of nitrogen, sulfur, and other impurities in the hydrocarbon feed can cause accelerated deactivation of the reformer catalyst. Preferably, the amount of nitrogen in the hydrocarbon feed is maintained at a level less than about 2.0 ppmw, more preferably less than about 1.0 ppmw, and most preferably less than 0.5 ppmw. Preferably, the amount of sulfur present in the hydrocarbon feed is maintained at a level less than about 2.0 ppmw, more preferably less than about 1.0 ppmw, and most preferably less than 0.5 ppmw.

The reforming conditions employed in the practice of the present invention may be any conditions necessary to effectively convert the hydrocarbon feed into a product of higher octane number. Octane number, as defined by ASTM D2699 for research octane number and ASTM D2700 for motor octane number, is an indication of a fuel's resistance to pre-ignition during the compression stroke of a piston.

The temperature required for reforming varies according to numerous reaction parameters, including, for example, feed composition, catalyst composition, pressure, amount of diluent, and the amount of coke on the reformer catalyst. Generally, the temperature required for reforming is in the range of from about 800° F. to about 1100° F. Ordinarily, the temperature is slowly increased during the reforming process to compensate for deactivation of the catalyst and to provide a product of a desired octane number.

The reforming reaction pressures are in the range of from about 0 psig to about 600 psig, preferably from about 15 psig to about 400 psig, and most preferably from 50 psig to 350 psig.

The liquid-volume hourly velocity (LHSV) of the hydrocarbon feed to the reformer reactor is in the range of from about 0.1 to about 100 hours$^{-1}$. The preferred LHSV of the hydrocarbon feed can be in the range of from about 0.25 to about 25 hours$^{-1}$.

In accordance with an embodiment of the present invention, it is essential for an organic aluminum halide compound to be present in the hydrocarbon feed during reforming. It has been discovered that organic aluminum halide compounds are superior reformer feed additives to inorganic aluminum chloride compounds because, for example, organic aluminum halide compounds are more soluble in hydrocarbon feeds than inorganic aluminum chloride compounds. The solubility properties of organic aluminum halide compounds allow for reliable, uniform injection into the hydrocarbon feed without clogging the injection means.

Not wishing to be bound by theory, it is further believed that injecting organic aluminum halide compounds into the hydrocarbon feed allows inorganic aluminum chlorides to form in the reformer reactor during reforming via a reaction between the organic aluminum halide compounds and other compounds present in the reformer reactor. The inorganic aluminum chloride compounds formed in situ are effective to inhibit deactivation of the reformer catalyst.

Any organic aluminum halide compound that is effective to inhibit deactivation of a reformer catalyst can be used in practicing the process of the present invention. Preferably, the organic aluminum halide compound is represented by the formula $R_nAlX_{3-n}$, wherein R is an alkyl, alkenyl, or aryl radical containing 1 to 18 carbon atoms, X is a halogen, and n is from 1 to 2. Preferably, R is an alkyl radical containing 1 to 4 carbon atoms, X is a halogen selected from the group consisting of chlorine, bromine, and fluorine, and n is from 1 to 2. Most preferably, R is ethyl, X is chlorine, and n is 1.

Preferred organic aluminum halide compounds include, for example, dimethyl aluminum chloride, diethyl aluminum chloride, di-n-propyl aluminum chloride, di-isobutyl aluminum chloride, di-n-butyl aluminum chloride, methyl aluminum sesqui-chloride, ethyl aluminum sesqui-chloride, n-propyl aluminum sesqui-chloride, isobutyl aluminum sesqui-chloride, n-butyl aluminum sesqui-chloride, methyl aluminum dichloride, ethyl aluminum dichloride, n-propyl aluminum dichloride, isobutyl aluminum dichloride, n-butyl aluminum dichloride, dimethyl aluminum bromide, diethyl aluminum bromide, di-n-propyl aluminum bromide, di-isobutyl aluminum bromide, di-n-butyl aluminum bromide, methyl aluminum sesqui-bromide, ethyl aluminum sesqui-bromide, n-propyl aluminum sesqui-bromide, isobutyl aluminum sesqui-bromide, n-butyl aluminum sesqui-bromide, methyl aluminum bromide, ethyl aluminum bromide, n-propyl aluminum bromide, isobutyl aluminum bromide, n-butyl aluminum bromide, dimethyl aluminum fluoride, diethyl aluminum fluoride, di-n-propyl aluminum fluoride, di-isobutyl aluminum fluoride, di-n-butyl aluminum fluoride, methyl aluminum sesqui-fluoride, ethyl aluminum sesqui-fluoride, n-propyl aluminum sesqui-fluoride, isobutyl aluminum sesqui-fluoride, n-butyl aluminum sesqui-fluoride, methyl aluminum fluoride, ethyl aluminum fluoride, n-propyl aluminum fluoride, isobutyl aluminum fluoride, n-butyl aluminum fluoride, and combinations or two of more thereof. More preferred organic aluminum halide compounds include, for example, dimethyl aluminum chloride, diethyl aluminum chloride, methyl aluminum dichloride, ethyl aluminum dichloride, dimethyl aluminum bromide, diethyl aluminum bromide, methyl aluminum bromide, ethyl aluminum bromide, dimethyl aluminum fluoride, diethyl aluminum fluoride, methyl aluminum fluoride, ethyl aluminum fluoride, and combinations or two of more thereof. The presently most preferred organic aluminum halide compound is ethyl aluminum dichloride.

The organic aluminum halide compound can be injected into the hydrocarbon feed at a point located immediately upstream from the inlet of the reformer reactor. As used herein, the phrase "immediately upstream from the inlet of the reformer reactor" means a location wherein there is no substantial change in the composition of the hydrocarbon feed and the additive between the additive injection point and the inlet of the reformer reactor.

The organic aluminum halide compound may be injected in pure form or with a carrier. Preferably, the organic aluminum halide compound is injected with a carrier. The carrier may be any compound capable of dissolving the organic aluminum halide compound which does not have an adverse material impact on the reforming reaction. Preferably, the carrier is a hydrocarbon.

The organic aluminum halide compound may be injected into the hydrocarbon feed by any method known in the art. In a multiple-reactor reformer, it is preferred for the organic aluminum halide compound to be injected immediately upstream from each individual reactor. Most preferably, in a multiple-reactor reformer the organic aluminum halide compound is sequentially injected into the reactors with only one reactor at a time receiving an injection of the organic aluminum halide compound.

A preferred injection system comprises an additive storage source connected in fluid flow communication with an additive moving means connected in fluid flow communication with an additive flow control means connected in fluid flow communication with an additive injection means. The additive storage source may be any conventional means of storing a quantity of a compound such as an organic aluminum halide compound, for example, a storage tank. The additive moving means may be any conventional means of moving a quantity of a compound such as an organic aluminum halide compound through a conduit, for example, a pump. The additive flow control means may be any conventional means for controlling the flow of a compound such as an organic aluminum halide compound to and/or among reforming reactors, for example, a valve or valves.

The additive injection means may be any conventional means for injecting a compound such as an organic aluminum halide compound into a conduit carrying a hydrocarbon feed, for example, a nozzle or quill.

The rate of injection of the organic aluminum halide compound into the hydrocarbon feed may be any rate suitable for inhibiting deactivation of the reformer catalyst. Preferably, the injection rate is sufficient to provide a concentration of the organic aluminum halide compound in the hydrocarbon feed of from about 0.001 ppbw to about 500 ppbw. More preferably, the injection rate provides a concentration of the organic aluminum halide compound in the hydrocarbon feed of from about 0.01 ppbw to about 100 ppbw. Still more preferably, the injection rate provides a concentration of the organic aluminum halide compound in the hydrocarbon feed of from about 0.1 ppbw to about 50 ppbw. Most preferably, the injection rate provides a concentration of the organic aluminum halide compound in the hydrocarbon feed of from 0.5 ppbw to 10 ppbw.

The period of organic aluminum halide compound injection into the hydrocarbon feed may be any suitable period that is effective to inhibit deactivation of the reformer catalyst. The organic aluminum halide compound can be injected continuously or intermittently, with intermittent injection being preferred. The intermittent injection method can comprise an injection period of from about 0.1 hours to about 100 hours, and a noninjection period which is from about 1 to about 20 times longer than the injection period. Preferably, the injection period is from 1.0 to 50 hours and the noninjection period is from 2 to 5 times longer than the injection period.

In accordance with an embodiment of the present invention, in addition to the presence of an organic aluminum halide compound in the hydrocarbon feed, a nonmetallic chloride compound is also present in the hydrocarbon feed during reforming. Not wishing to be bound by theory, it is believed that one of the advantages of having both an organic aluminum halide compound and a nonmetallic chloride compound present in the reformer feed is that the organic aluminum halide compound can react with the nonmetallic chloride compound in the reformer reactor to produce an inorganic aluminum chloride compound in situ. The inorganic aluminum chloride compound produced in situ is effective to inhibit deactivation of the reformer catalyst.

The nonmetallic chloride compound can be any nonmetallic chloride-containing compound suitable for inhibiting the deactivation of a reformer catalyst when used in combination with an organic aluminum halide compound and capable of reacting with an organic aluminum halide compound under reforming conditions to produce an inorganic aluminum chloride compound. Preferably, the nonmetallic chloride compound is selected from the group consisting of perchloroethylene, tetrachloroethylene, hexachloroethane, carbon tetrachloride, 1-chlorobutene, 1-chloro-2-methylpropane, 2-chloro-2-methylpropane propylene dichloride, hydrogen chloride, and mixtures of two or more thereof. More preferably, the nonmetallic chloride compound is selected from the group consisting of perchloroethylene, hydrogen chloride, and mixtures thereof. Most preferably, the nonmetallic chloride compound is perchloroethylene.

The amount of nonmetallic chloride compound injected into the reformer feed can be any amount which, when used in combination with an organic aluminum halide compound is suitable for inhibiting the deactivation of the reformer catalyst and reacting with organic aluminum halide compounds under reforming conditions to produce inorganic aluminum chloride compounds in the reformer reactor. Preferably, the amount of nonmetallic chloride compound injected is an amount which is sufficient to provide a concentration of the nonmetallic chloride compound in the hydrocarbon feed in the range of from about 0.01 ppmw to about 500 ppmw, more preferably from about 0.1 ppmw to about 100 ppmw, still more preferably from about 0.2 ppmw to about 50 ppmw, and most preferably from 0.5 ppmw to 10 ppmw.

The weight ratio of organic aluminum halide compound to nonmetallic chloride compound in the hydrocarbon feed can be from about 1:100,000 to about 1:10, preferably from about 1:10,000 to about 1:50, and most preferably from 1:5,000 to 1:500.

The organic aluminum halide compound and the nonmetallic chloride compound can be injected into the hydrocarbon feed at separate injection points, or can be mixed prior to injection and introduced into the hydrocarbon feed together. The nonmetallic chloride compound is preferably injected immediately upstream from the inlet of the reformer reactor. The nonmetallic chloride compound may be injected into the hydrocarbon feed by any method known in the art, including in the same manner described above for injecting the organic aluminum halide compound.

The nonmetallic chloride compound may be injected in pure form or with a carrier. Preferably, the nonmetallic chloride compound is injected with a carrier. The carrier may be any compound capable of dissolving the nonmetallic chloride compound which does not have an adverse material impact on the reformer reaction. Preferably, the carrier is a hydrocarbon.

The period of injection for the nonmetallic chloride compound in combination with the organic aluminum halide compound may be any suitable period that is effective to inhibit deactivation of the reformer catalyst. The nonmetallic chloride compound can be injected continuously or intermittently, with intermittent injection being preferred. The intermittent injection method can comprise an injection period of from about 0.1 hours to about 100 hours, and a non-injection period which is from about 1.0 to about 20 times longer than the injection period. Preferably, the injection period is from 10 to 50 hours and the non-injection period is from 2 to 5 times longer than the injection period.

The following example is presented to further illustrate the invention and is not considered as limiting the scope of the invention.

EXAMPLE I

This example demonstrates that an organic aluminum chloride feedstream additive is at least as effective as, if not more effective than, an inorganic aluminum chloride feedstream additive for maintaining and/or promoting the activity of a reformer catalyst.

A stainless-steel reactor having an inside diameter of about 0.75 inches and a height of about 28 inches was filled with a bottom layer of about 13.5 inches of inert alumina particles having a surface area of 1 $m^2/g$ or less, a middle layer of about 6 inches of R-56 platinum/rhenium/alumina reforming catalyst (marketed by UOP, Des Plaines, Il.) (containing about 0.25 weight percent platinum, about 0.40 weight percent rhenium, and about 1.0 weight percent chlorine), and a top layer of about 8 inches of inert alumina particles having a surface area of 1 $m^2/g$ or less.

The reactor was brought to reaction conditions. The reaction conditions employed during the experimental run of this example included a reaction temperature of about 919° F. and a reaction pressure of about 300 psig.

A liquid naphtha feed was charged to the reactor. The naphtha feed comprised about 18 weight percent n-paraffins, about 26 weight percent isoparaffins, about 28.3 weight percent naphthenes, and about 24.4 weight percent aromatics. The naphtha feed had an initial boiling point of 189° F., an end point of 698° F., and an average molecular weight of 113.8. The liquid-volume hourly space velocity of the naphtha feed was about 2.5 $hr^{-1}$. Hydrogen was charged to the reactor simultaneously with the naphtha feed. Table I shows the hydrogen to hydrocarbon ($H_2$:HC) ratio of the charge to the reactor.

Perchloroethylene (PCE) was added to the naphtha feed prior to entering the reactor. In addition, during separate periods of the experimental run of this example, an inorganic aluminum chloride compound ($AlCl_3$) and an organic aluminum chloride compound ($EtAlCl_2$) were added to the naphtha feed. Table I shows the amount of PCE, $AlCl_3$, and $EtAlCl_2$ added to the naphtha feed.

Product octane (RON) was measured on days 2, 3, 11, 17, 22–27, 30–35, 37–40 and 44–48. Table I provides the measured RON values. FIG. 1 plots RON as a function of time for the experimental run of the present example.

As illustrated in Table 1 and FIG. 1, the organic aluminum chloride compound is at least as effective as, if not more effective than, the inorganic aluminum chloride compound for maintaining and/or promoting the activity of the reformer catalyst. In addition, Table 1 and FIG. 1 show that the present invention provides a reformer product of higher octane number.

TABLE 1

| Time (day) | $H_2$:HC (wt. ratio) | PCE (ppmw) | $AlCl_3$ (ppbw) | $EtAlCl_2$ (ppbw) | Octane (RON) |
|---|---|---|---|---|---|
| 1 | 2.1 | 1.07 | 0.166 | — | — |
| 2 | 2.1 | 1.07 | 0.166 | — | 90.50 |
| 3 | 2.1 | 1.07 | 0.166 | — | 90.30 |
| 4 | 2.2 | 1.07 | 0.166 | — | — |
| 5 | 2.2 | 1.07 | 0.166 | — | — |
| 6 | 2.2 | 1.07 | 0.166 | — | — |
| 7 | 2.2 | 1.07 | 0.166 | — | — |
| 8 | 2.2 | 1.07 | 0.166 | — | — |
| 9 | 2.2 | 1.07 | 0.166 | — | — |
| 10 | 2.2 | 1.07 | 0.166 | — | — |
| 11 | 2.2 | 1.07 | 0.166 | — | 90.46 |
| 12 | 2.2 | 1.07 | 0.166 | — | — |
| 13 | 2.2 | 1.07 | 0.166 | — | — |
| 14 | 2.2 | 1.07 | 0.166 | — | — |
| 15 | 2.2 | 1.07 | 0.166 | — | — |
| 16 | 2.2 | 1.07 | 0.166 | — | — |
| 17 | 2.2 | 1.07 | 0.166 | — | 90.54 |
| 18 | 2.2 | 1.07 | 0.166 | — | — |
| 19 | 2.2 | 1.07 | 0.166 | — | — |
| 20 | 2.2 | 1.07 | 0.166 | — | — |
| 21 | 2.2 | 1.07 | 0.166 | — | — |
| 22 | 2.2 | 1.07 | 0.166 | — | 90.84 |
| 23 | 2.2 | 1.07 | 0.166 | — | 90.27 |
| 24 | 2.2 | 1.07 | 0.166 | — | 90.85 |
| 25 | 2.2 | 1.07 | — | 0.166 | 90.73 |
| 26 | 2.2 | 1.07 | — | 0.166 | 90.00 |
| 27 | 2.2 | 1.07 | — | 0.166 | 90.73 |
| 28 | 2.2 | 1.07 | — | 0.166 | — |
| 29 | 2.2 | 1.07 | — | 0.166 | — |
| 30 | 1.1 | 1.07 | — | 0.166 | 91.90 |
| 31 | 1.1 | 1.07 | — | 0.166 | 92.00 |
| 32 | 1.1 | 1.07 | — | 0.166 | 92.00 |
| 33 | 1.1 | 1.07 | — | 0.166 | 91.80 |
| 34 | 1.1 | 1.07 | — | 0.166 | 91.70 |
| 35 | 1.1 | 1.07 | — | 0.166 | — |
| 36 | 1.1 | 1.07 | — | 0.166 | — |

TABLE 1-continued

| Time (day) | $H_2$:HC (wt. ratio) | PCE (ppmw) | $AlCl_3$ (ppbw) | $EtAlCl_2$ (ppbw) | Octane (RON) |
|---|---|---|---|---|---|
| 37 | 1.1 | 1.07 | — | 0.166 | 91.61 |
| 38 | 1.1 | 2.14 | — | 0.332 | 90.80 |
| 39 | 1.1 | 2.14 | — | 0.332 | 91.40 |
| 40 | 1.1 | 2.14 | — | 0.332 | 91.43 |
| 41 | 1.1 | 2.14 | — | 0.332 | 91.25 |
| 42 | 1.1 | 2.14 | — | 0.332 | — |
| 43 | 1.1 | 2.14 | — | 0.332 | — |
| 44 | 1.1 | 2.14 | — | 0.332 | 91.60 |
| 45 | 1.1 | 2.14 | — | 0.332 | 91.50 |
| 46 | 1.1 | 2.14 | — | 0.332 | 91.40 |
| 47 | 1.1 | 2.14 | — | 0.332 | 91.20 |
| 48 | 1.1 | 2.14 | — | 0.332 | 91.20 |

While this invention has been described in detail for the purpose of illustration, it should not be construed as limited thereby but intended to cover all changes and modifications within the spirit and scope thereof.

That which is claimed is:

1. A process comprising charging a reformer feed having a concentration of an organic aluminum halide compound in the range of from about 0.001 ppbw to about 500 ppbw to a reformer reactor operating under reforming conditions and containing a reformer catalyst.

2. A process according to claim 1 wherein said organic aluminum halide compound is represented by the formula $R_nAlX_{3-n}$, wherein R is an alkyl, alkenyl, or aryl radical containing 1 to 18 carbon atoms, X is a halogen, and n is from 1 to 2.

3. A process according to claim 2 wherein said concentration of said organic aluminum halide compound is in the range of from about 0.01 ppbw to about 100 ppbw.

4. A process according to claim 3 wherein said reformer catalyst comprises platinum and alumina.

5. A process according to claim 1 wherein said organic aluminum halide compound is represented by the formula $R_nAlX_{3-n}$, wherein R is an alkyl radical containing 1 to 4 carbon atoms, X is a halogen selected from the group consisting of chlorine, bromine, and fluorine, and n is from 1 to 2.

6. A process according to claim 5 wherein said concentration of said organic aluminum halide compound is in the range of from about 0.1 ppbw to about 50 ppbw.

7. A process according to claim 6 wherein said reformer feed contains water in a concentration of more than 1 ppmw.

8. A process according to claim 7 wherein said reformer catalyst comprises platinum, alumina, and a metal selected from the group consisting of rhenium and germanium.

9. A process according to claim 1 wherein said organic aluminum halide compound is ethyl aluminum dichloride.

10. A process according to claim 9 wherein said concentration of said organic aluminum halide compound is in the range of from 0.5 ppbw to 10 ppbw.

11. A process according to claim 10 wherein said reformer feed contains water in a concentration of from about 5 ppmw to about 75 ppmw.

12. A process according to claim 11 wherein said reformer catalyst comprises platinum, rhenium, chlorine, and alumina.

13. A reforming process comprising the steps of:
charging a hydrocarbon feed comprising a reformable hydrocarbon to a reformer reactor which defines a reaction zone containing a reformer catalyst, wherein said reformer reactor is operated under reforming conditions; and
introducing an organic aluminum halide compound into said hydrocarbon feed in an amount that is effective to inhibit deactivation of said reformer catalyst.

14. A process according to claim 13 wherein said organic aluminum halide compound is represented by the formula $R_nAlX_{3-n}$, wherein R is an alkyl, alkenyl, or aryl radical containing 1 to 18 carbon atoms, X is a halogen, and n is from 1 to 2.

15. A process according to claim 14 wherein said amount of said organic aluminum halide compound introduced into said hydrocarbon feed is such as to provide a concentration of said organic aluminum halide in said hydrocarbon feed of from about 0.001 ppbw to about 500 ppbw.

16. A process according to claim 15 wherein said hydrocarbon feed contains water in a concentration of greater than about 1 ppmw.

17. A process according to claim 16 wherein said reformer catalyst comprises platinum and alumina.

18. A process according to claim 13 wherein said organic aluminum halide compound is represented by the formula $R_nAlX_{3-n}$, wherein R is an alkyl radical containing 1 to 4 carbon atoms, X is a halogen selected from the group consisting of chlorine, bromine, and fluorine, and n is from 1 to 2.

19. A process according to claim 18 wherein said amount of said organic aluminum halide compound introduced into said hydrocarbon feed is such as to provide a concentration of said organic aluminum halide in said hydrocarbon feed of from about 0.01 ppbw to about 100 ppbw.

20. A process according to claim 19 wherein said hydrocarbon feed contains water in a concentration of from about 1 ppmw to about 500 ppmw.

21. A process according to claim 20 wherein said reformer catalyst comprises platinum, alumina, and a metal selected from the group consisting of rhenium and germanium.

22. A process according to claim 13 wherein said organic aluminum halide compound is ethyl aluminum dichloride.

23. A process according to claim 22 wherein said amount of said organic aluminum halide compound introduced into said hydrocarbon feed is such as to provide a concentration of said organic aluminum halide in said hydrocarbon feed of from about 0.1 ppbw to about 50 ppbw.

24. A process according to claim 23 wherein said hydrocarbon feed contains water in a concentration of from about 5 ppmw to about 75 ppmw.

25. A process according to claim 24 wherein said reformer catalyst comprises platinum, rhenium, chlorine, and alumina.

26. A reforming process comprising the steps of:
charging a hydrocarbon feed comprising a reformable hydrocarbon to a reformer reactor which defines a reaction zone containing a reformer catalyst, wherein said reformer reactor is operated under reforming conditions; and
introducing a first amount of an organic aluminum halide compound and a second amount of a nonmetallic chloride compound into said hydrocarbon feed, wherein said first amount and said second amount are effective to inhibit deactivation of said reformer catalyst.

27. A process according to claim 26 wherein said organic aluminum halide compound is represented by the formula $R_nAlX_{3-n}$, wherein R is an alkyl, alkenyl, or aryl radical containing 1 to 18 carbon atoms, X is a halogen, and n is from 1 to 2.

28. A process according to claim 27 wherein said nonmetallic chloride compound is selected from the group consisting of perchloroethylene, tetrachloroethylene, hexachloroethane, carbon tetrachloride, 1-chlorobutene, 1-chloro-2-methylpropane, 2-chloro-2-methylpropane, propylene dichloride, hydrogen chloride, and mixtures of two or more thereof.

29. A process according to claim 28 wherein said first amount of said organic aluminum halide compound introduced into said hydrocarbon feed is such as to provide a concentration of said organic aluminum halide in said hydrocarbon feed of from about 0.001 ppbw to about 500 ppbw, and wherein said second amount of said nonmetallic chloride compound introduced into said hydrocarbon feed is such as to provide a concentration of said nonmetallic chloride compound in said hydrocarbon feed of from about 0.01 ppmw to about 500 ppmw.

30. A process according to claim 29 wherein the weight ratio of said organic aluminum halide compound to said nonmetallic chloride compound in said hydrocarbon feed is from about 1:100,000 to 1:10.

31. A process according to claim 30 wherein said hydrocarbon feed contains water in a concentration greater than about 1 ppmw.

32. A process according to claim 31 wherein said reformer catalyst comprises platinum and alumina.

33. A process according to claim 26 wherein said organic aluminum halide compound is represented by the formula $R_nAlX_{3-n}$, wherein R is an alkyl radical containing 1 to 4 carbon atoms, X is a halogen selected from the group consisting of chlorine, bromine, and fluorine, and n is from 1 to 2.

34. A process according to claim 33 wherein said nonmetallic chloride compound is selected from the group consisting of perchloroethylene, hydrogen chloride, and mixtures thereof.

35. A process according to claim 34 wherein said amount of said first amount of said organic aluminum halide compound introduced into said hydrocarbon feed is such as to provide a concentration of said organic aluminum halide compound in said hydrocarbon feed of from about 0.01 ppbw to about 100 ppbw, and wherein said second amount of said nonmetallic chloride compound introduced into said hydrocarbon feed is such as to provide a concentration of said nonmetallic chloride compound in said hydrocarbon feed of from about 0.1 ppmw to about 100 ppmw.

36. A process according to claim 35 wherein the weight ratio of said organic aluminum halide compound to said nonmetallic chloride compound in said hydrocarbon feed is from about 1:25,000 to about 1:50.

37. A process according to claim 36 wherein said hydrocarbon feed contains water in a concentration of from about 1 ppmw to about 500 ppmw.

38. A process according to claim 37 wherein said reformer catalyst comprises platinum, alumina, and a metal selected from the group consisting of rhenium and germanium.

39. A process according to claim 26 wherein said organic aluminum halide compound is ethyl aluminum chloride.

40. A process according to claim 39 wherein said nonmetallic chloride compound is perchloroethylene.

41. A process according to claim 40 wherein said first amount of said organic aluminum halide compound introduced into said hydrocarbon feed is such as to provide a concentration of said organic aluminum halide compound in said hydrocarbon feed of from 0.5 ppbw to 10 ppbw, and wherein said second amount of said nonmetallic chloride compound introduced into said hydrocarbon feed is such as to provide a concentration of said nonmetallic chloride compound in said hydrocarbon feed of from about 0.5 ppmw to about 10 ppmw.

42. A process according to claim 41 wherein the weight ratio of said organic aluminum halide compound to said nonmetallic chloride compound in said hydrocarbon feed is from 1:5,000 to 1:500.

43. A process according to claim 42 wherein said hydrocarbon feed contains water in a concentration of from about 5 ppmw to about 75 ppmw.

44. A process according to claim 43 wherein said reformer catalyst comprises platinum, rhenium, chlorine, and alumina.

* * * * *